US009766865B2

(12) United States Patent
Burghard et al.

(10) Patent No.: US 9,766,865 B2
(45) Date of Patent: *Sep. 19, 2017

(54) MAINTAINING CONSISTENCY AMONGST DATA STRUCTURES THAT ARE REFERENCED WITHIN DIFFERENT PROGRAMS

(75) Inventors: Stephen J. Burghard, Winchester (GB); Mark Todd, Winchester (GB); Philip R. Lee, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/405,314

(22) Filed: Feb. 26, 2012

(65) Prior Publication Data
US 2012/0159440 A1    Jun. 21, 2012

Related U.S. Application Data

(63) Continuation of application No. 13/246,513, filed on Sep. 27, 2011.

(30) Foreign Application Priority Data
Oct. 22, 2010    (EP) .................... 10188528

(51) Int. Cl.
G06F 9/44    (2006.01)
G06F 9/45    (2006.01)
(Continued)

(52) U.S. Cl.
CPC ............... *G06F 8/43* (2013.01); *G06F 8/315* (2013.01); *G06F 8/52* (2013.01); *G06F 8/71* (2013.01);
(Continued)

(58) Field of Classification Search
CPC ... G06F 8/315; G06F 8/43; G06F 8/52; G06F 8/71; G06F 9/4443; G06F 17/30; G06F 11/366; G06F 11/368
(Continued)

(56) References Cited

U.S. PATENT DOCUMENTS 5,101,494 A * 3/1992 Bilski ................ G06F 8/71
711/1
6,305,011 B1 * 10/2001 Safonov ............. G06F 8/41
717/114
(Continued)

OTHER PUBLICATIONS

International Search Report and Written Opinion of the International Searching Authority for International Application No. PCT/EP2011/065034 dated Jan. 20, 2012.
(Continued)

*Primary Examiner* — Wei Zhen
*Assistant Examiner* — Mohammed Huda
(74) *Attorney, Agent, or Firm* — Winstead, P.C.

(57) ABSTRACT

A method for developing software in which the software comprises a plurality of programs. A change to a program is received. A data structure checking procedure may then be invoked. The changed program is parsed for a reference to a data structure. Other instances of the data structure are located in other programs within the software. The referenced data structure is compared to the located other instances of the data structure. A predefined action (such as notifying a programmer or correcting the inconsistencies) is performed in response to any detected differences between the referenced data structure and the located other instances of the data structure. These steps are repeated for all data structures within the changed program.

4 Claims, 5 Drawing Sheets

(51) Int. Cl.
    *G06F 17/30*      (2006.01)
    *G06F 11/36*      (2006.01)
(52) U.S. Cl.
    CPC .......... *G06F 9/4443* (2013.01); *G06F 11/366* (2013.01); *G06F 11/368* (2013.01); *G06F 17/30* (2013.01)
(58) Field of Classification Search
    USPC ........ 717/121, 104, 105, 110, 114, 127, 140
    See application file for complete search history.

(56) References Cited

U.S. PATENT DOCUMENTS

| | | | |
|---|---|---|---|
| 6,473,807 B1 | 10/2002 | Hills et al. | |
| 6,550,057 B1* | 4/2003 | Bowman-Amuah | G06F 17/30 700/80 |
| 2006/0168558 A1* | 7/2006 | de Seabra e Melo | G06F 8/71 717/105 |
| 2007/0288892 A1* | 12/2007 | Foti | G06F 8/315 717/114 |
| 2008/0021883 A1* | 1/2008 | Alstrin | H04L 43/0817 |

OTHER PUBLICATIONS

Tod, "Using Lint in Eclipse," syncor.blogspot.com/2010/03/using-lint-in-eclipse-with-netburner.html, Mar. 4, 2010.
Gimpel Software, "On-Line Message Reference for FlexeLint and PC-lint," gimpel-online.com/MsgRef.html, Dec. 31, 2009.
Office Action for U.S. Appl. No. 13/246,513 dated Mar. 26, 2013.
Office Action for U.S. Appl. No. 13/246,513 dated Nov. 6, 2013, pp. 1-32.
Office Action for U.S. Appl. No. 13/246,513 dated Feb. 27, 2017, pp. 1-18.

* cited by examiner

MAINTAINING CONSISTENCY AMONGST DATA STRUCTURES THAT ARE REFERENCED WITHIN DIFFERENT PROGRAMS

CROSS-REFERENCE TO RELATED APPLICATIONS

The present application is a continuation application of pending U.S. patent application Ser. No. 13/246,513, which was filed on Sep. 27, 2011, which is assigned to the assignee of the present invention. The present application claims priority benefits to U.S. patent application Ser. No. 13/246,513, which claims priority under 35 U.S.C. §119(a) from European Patent Application No. 10188528.3, filed on Oct. 22, 2010, the contents of which are incorporated herein by reference.

TECHNICAL FIELD

The present invention relates to software, and more particularly, to developing software.

BACKGROUND

Large and complex software systems, such as transaction processing software, are composed of many thousands of separate programs. These make use of many thousands of data structures. A data structure is a description of data to be found in memory that is designed as a way of storing and organizing data in a computer so that the data can be used efficiently. A transaction processing system, such as the IBM® CICS® transaction processing system, will generally provide data structures that are declared in, for example, assembler, and resolve to a dummy section that maps the structure of the data areas used by the programs. In the CICS example, data structures are also provided in other languages such as COBOL and C. (IBM and CICS are trademarks of International Business Machines Corporation, registered in many jurisdictions worldwide.)

Since the data structure may be referenced at run-time by programs written in a variety of languages, there is often the need to declare the same data structure mapping in more than one programming language. Again, the typical requirement in the CICS example is to declare data structures in two languages, including assembler. There is an obvious requirement for the two structures to match, and resolve to the same field names, at the same offsets, for the same lengths of each field. If the data structures are not directly equivalent, unpredictable results may well occur at run-time, and the code will almost certainly not function correctly.

One approach to this problem is to generate bilingual copybooks. These declare the structure in one language. At compilation time, part of the compilation pre-processing stage takes this file as an input, and builds the corresponding assembler equivalent file as an output. In this way, the generated assembler data structure is made to match a hand-written data structure, and the two are kept in step. The problem with this approach is that not all data structures are written in a bilingual manner. There are a great many existing data structures that were hand-written in various languages, and need to be manually kept in step whenever they are changed or extended.

Furthermore, there exists the issue of disparate data structures written in the same language, which are intended to map the same structures, but which have been defined inconsistently to each other. It is possible that data structures are declared several times within part of a product. In the CICS case, parts of the product known as domains may have several data structures that are declared in a variety of places. These data structures may all map to the same underlying structures. Again, these all have to remain in an equivalent state when changes are made to the structures.

BRIEF SUMMARY

In one embodiment of the present invention, a method for developing software, the software comprising a plurality of programs, the method comprises receiving a change to a program. The method further comprises invoking a data structure checking procedure. Additionally, the method comprises parsing the changed program for reference to a data structure. In addition, the method comprises locating other instances of the data structure in other programs within the software. Furthermore, the method comprises comparing the referenced data structure to the located other instances of the data structure. The method additionally comprises performing, by a processor, a predefined action in response to any detected differences between the referenced data structure and the located other instances of the data structure. In addition, the method comprises repeating said parsing, locating, comparing and performing for all data structures within the changed program.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
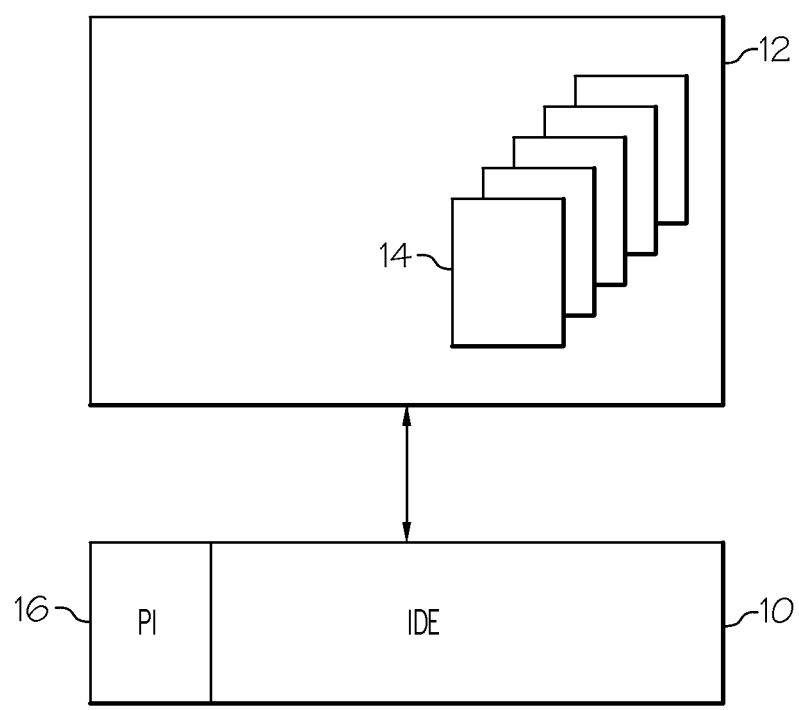
FIG. 1 is a schematic diagram of a software product and an integrated development environment in accordance with an embodiment of the present invention.

By implementing the principles of the present invention, it is possible to provide an automated means of comparing disparate but matching data structures to ensure that their structures remain comparable after any changes have been made to them. This avoids the problem of manual errors occurring after changes have been made and data structures being changed in an inconsistent manner. By automating the comparison between data structures, run-time programming errors can be avoided which would otherwise lead to application or system failures. Unpredictable results could be, for example, storage overlays, abends, program checks or potentially system failures in the worst case.

The method, computer program product and system of the present invention provide a validation checking mechanism to be included within the code generation tooling, as (for example) a compiler plug-in. The checking mechanism could just as easily be provided as a function of an integrated development environment (IDE). Whatever the implementation used, the mechanism would parse the source code as part of the processing, and check the various data structures being changed by the developer or coder. The mechanism would validate that different (but equivalent) data structures were still functionally declared in an equivalent manner.

In one embodiment, the step of performing a predefined action comprises outputting a report detailing the detected differences between a referenced data structure and any other instance of the data structure. Once another instance of the data structure under examination has been found not to match the referenced data structure, then a report can be generated and outputted to the programmer, either in real-time or as a saved report that can be accessed when desired. This report will inform the programmer of the existence of the other instance of the data structure, its location and the details of the detected difference between the two instances of the data structure.

Advantageously, the step of performing a predefined action comprises changing each of the other instances of the data structure to match the referenced data structure. Additionally or alternatively to the generation of a report, the mechanism can perform an auto-correction of the other instances of the data structure that have been located elsewhere within the software product. This provides an effective and efficient method by which the overall software product can be kept consistent, in terms of the data structures that are located in different programs throughout the product. Once a program has been changed to change a data structure, then any further data structures that are found by the mechanism will be automatically brought into line with the changed data structure.

In one embodiment, the step of locating other instances of a referenced data structure comprises locating data structures with the same name as the referenced data structure. The mechanism has to have a way of identifying those other data structures that are indeed other instances of the actual data structure that is being checked. In its simplest form, this operation could be to look for other data structures that carry the same name as the data structure that is being looked at. This can be assumed to mean that any other data structure with the same name is therefore another instance of the same data structure. Other methods could be used in addition. For example, the search could be based upon structural features of the located data structures to see if they are purporting to be the same data structure.

In one embodiment, the method further comprises detecting a data structure similar to the referenced data structure and generating a notification detailing the detected similar data structure. In addition to locating data structures that are indeed other instances of the actual data structure that is being looked at, it can be advantageous to notify the programmer if there is located any other data structures that are considered to be "similar" to the data structure that has been changed. The test of similarity could be based on specific percentage of field numbers and lengths that are identical, for example. This will allow a programmer to review other data structures that are located in this manner, to see if indeed these "similar" data structures are actually supposed to be the same as the one that is currently under examination. This will allow the programmer to change these other "similar" data structures manually, if need be.

Referring now to the Figures in detail, FIG. 1 shows schematically an integrated development environment (IDE) 10 in accordance with an embodiment of the present invention. The IDE 10 is being used by a programmer in relation to a software product 12, which is comprised of individual programs 14. The software product 12 could be a transaction processing system, for example, which is designed to handle a large number of transactions per second, while maintaining a high level of integrity and accuracy. Such a transaction processing system might be used by a financial institution, such as a bank, in relation to a website that allows users to access their accounts online. The programmer uses the IDE 10 to create, delete and amend the individual programs 14. The IDE 10 is one example of an implementation of the invention, another being as a compiler or a plug-in environment.

The IDE 10 also includes a plug-in 16 (identified by "PI" in FIG. 1), which performs a specific purpose in relation to the work carried out by the programmer. In reality, the IDE 10 may have multiple plug-ins all performing different purposes, but a single plug-in 16 is shown in order to illustrate the present invention in this embodiment. The IDE 10 is itself a piece of software and the plug-in 16 is a further piece of code that has been created specifically to work with the IDE 10. As the programmer interacts with the IDE 10, then the plug-in 16 works in the background, with the programmer being aware of the tasks being carried out by the plug-in 16.

The programs 14 may be written in the same programming language or may be written in different languages. Software products, such as transaction processing systems, will usually have programs written in different languages. The IDE 10 will normally be specific to one particular language, and the programmer will be able to create and amend programs 14 that are written in that language. The complexity of the software product 12 means that there could easily be hundreds of individual programs 14 making up the software product 12, often with a large number of different programmers contributing to the product 12. This makes the tracking of elements within the different programs 14 a non-trivial task.

The purpose of the plug-in 16 is to maintain consistency amongst data structures that are referenced within different programs 14 that are written in the same programming language. When a programmer creates a new program 14 or amends an existing program 14, then it is important that all instances of the same data structure are consistent with each other. Since the programs 14 have been written by different programmers at different times, it is very easy for individual programmers to be unaware of the existence of all of the instances of a specific data structure. Once a programmer has created or amended a data structure, then the plug-in 16 will operate.

Figure 2:
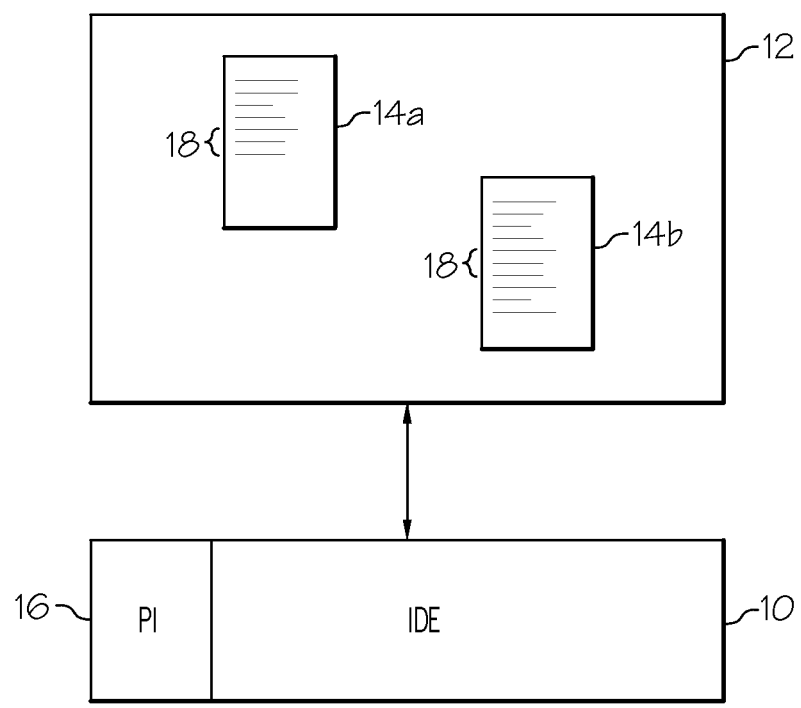
FIG. 2 is a schematic diagram of a software product including two different programs that both reference the same data structure in accordance with an embodiment of the present invention.

The plug-in 16 within the IDE 10 needs to have access to any changed data structures. This could occur during development of code, or during the servicing of existing code. Either way, as changes are made to equivalent data structures, so the plug-in 16 would compare the resulting structures to ensure that they were matching. This would cater for the case of duplicated data structures that have been hand-written in different parts of a product 12. In this example environment, the programs 14 are written in the same language and map to the same underlying data structure. FIG. 2 shows two different programs 14a and 14b within the software product 12 that both reference the same data structure 18 in accordance with an embodiment of the present invention.

Referring to FIG. 2, the plug-in 16 could compare the two data structures 18, validating that their structures have remained consistent. This checking could include validating that the field names match in each case, validating the declared lengths of each field and validating the overall length of the control block. In this way, the IDE 10, through the plug-in 16, is able to automatically detect if a change has been made to a data structure 18 that will render that changed data structure 18 inconsistent with any other instances of that data structure 18 in other programs 14 within the overall software product 12. The plug-in 16 locates other instances of the data structure 18 and compares the instances to the changed data structure 18.

The plug-in 16 can report, via the IDE 10, a mismatch message such as:

>>>INVENTION MESSAGE xxxx. Note that the data structure yyyy is declared in multiple places, within modules 1111, 2222 (etc). These declarations are not consistent and represent different mappings over the same area of storage. You should review the declarations and validate the reason for this inconsistency.

The IDE 10 can also potentially break down the mismatches with subsequent messages such as:

>>>INVENTION MESSAGE zzzz. Field qqqq is declared as a 4 byte unsigned field in its structure declaration in module 1111, and as an 8 byte unsigned field in module 2222. The data structure does not define a consistent mapping to the storage for this data.

Figure 3:
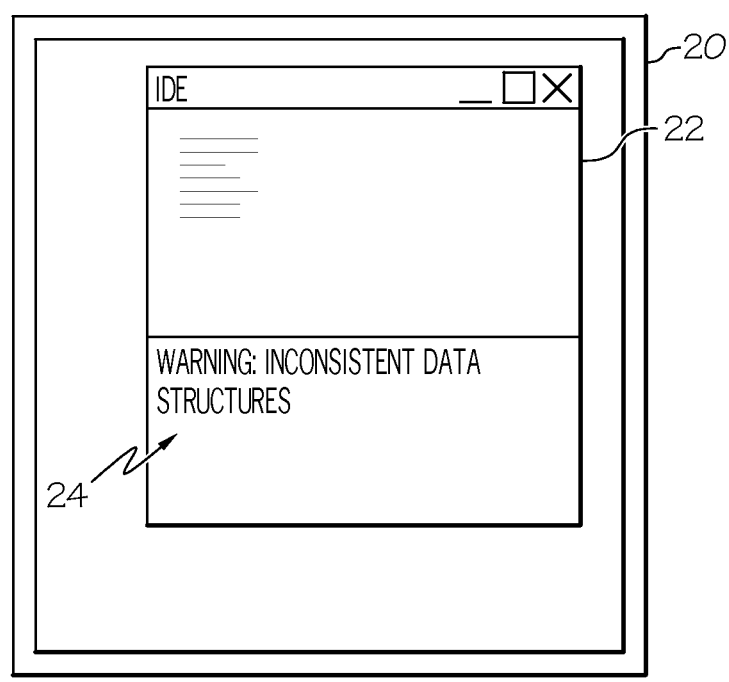
FIG. 3 is a schematic diagram of a display device showing a graphical user interface for the integrated development environment in accordance with an embodiment of the present invention.

FIG. 3 illustrates a display device 20, which is showing a GUI 22 for the IDE 10 (FIGS. 1 and 2) in accordance with an embodiment of the present invention. Referring to FIG. 3, in conjunction with FIG. 2, the operation of the plug-in 16 has resulted in the detection of a mismatch between two different instances of the same data structure 18. As a result, an error message 24 has been generated detailing the detected differences between the two instances of the data structure 18. This error message or report 24 is a defined action that is taken in response to the detected differences between the instances of the data structure 18. The programmer can decide on the course of action that should be correctly taken in response to the message 24.

The plug-in 16 or IDE 10 could also potentially take action to correct the duplicated but incorrect structures 18 to be the same as the new, altered one. This would be optional, since changing the code to automatically maintain consistency is something which different development organizations may have different views upon. At a minimum, plug-in 16 or IDE 10 could map out the differences and suggest what changes could be made to restore consistent mappings from the different versions of the data structures 18. The plug-in 16 and IDE 10 are providing an automated validation (and potentially correction) of disparate inconsistent data structures 18 that are present in different programs 14.

Detailed below are two examples of data structures 18 (storage area mappings) which should match but which have become out of step due to some development or service-related change. These two data structures 18 are present in different programs 14 within the software product 12 and both are generated in the same programming language. In order for the finished software product 12 to function properly at runtime, it is essential that all instances of the same data structure 18 are the same. The plug-in 16 within the IDE 10 is designed to locate other instances of the same data structure 18 and detect any difference between them, in order that the programmer can correct this inconsistency.

EXAMPLE 1

```
DFHDEMO1 DSECT
DFHDEMO1_START DS 0CL40                              Demo record
DEMO_RESTART_KEY DS CL28
DEMO_RESTART_COUNTS DS 0CL12
DEMO_RESTART_COUNTS@DEMO_TYPE1 DS FL4                Count 1
DEMO_RESTART_COUNTS@DEMO_TYPE2 DS FL4                Count 2
DEMO_RESTART_COUNTS@DEMO_TYPE3 DS FL4                Count 3
DFHDEMO1_LEN EQU *-DFHDEMO1_START                    Structure
                                                     length
```

EXAMPLE 2

```
DFHDEMO1 DSECT
DFHDEMO1_START DS 0CL44                              Demo record
DEMO_RESTART_KEY DS CL28
DEMO_RESTART_COUNTS DS 0CL16
DEMO_RESTART_COUNTS@DEMO_TYPE1 DS FL4                Count 1
DEMO_RESTART_COUNTS@DEMO_TYPE2 DS FL4                Count 2
DEMO_RESTART_COUNTS@DEMO_TYPE2A DS FL4               Count 2A
DEMO_RESTART_COUNTS@DEMO_TYPE3 DS FL4                Count 3
DFHDEMO1_LEN EQU *-DFHDEMO1_START                    Structure
                                                     length
```

It is assumed that a first program 14 refers to the first DFHDEMO1 structure 18 (example 1), and a second program 14 refers to the second data structure 18 (example 2). In the second example, a programmer has added a new four character field midway into the structure, which is DEMO_TYPE2A. This has meant DEMO_TYPE3 is now four characters further into the data structure 18. Additionally, this change has also meant that the length of the data structure 18 has increased by four characters, from forty to forty-four characters in length. If the first program and the second program both need to reference a piece of memory that was mapped by DEMO_TYPE3 in these data structures 18, they would think the fields were at different places, and the structure length was different. Unpredictable runtime errors would result because of this inconsistency between the two instances of the data structure 18.

Figure 4:
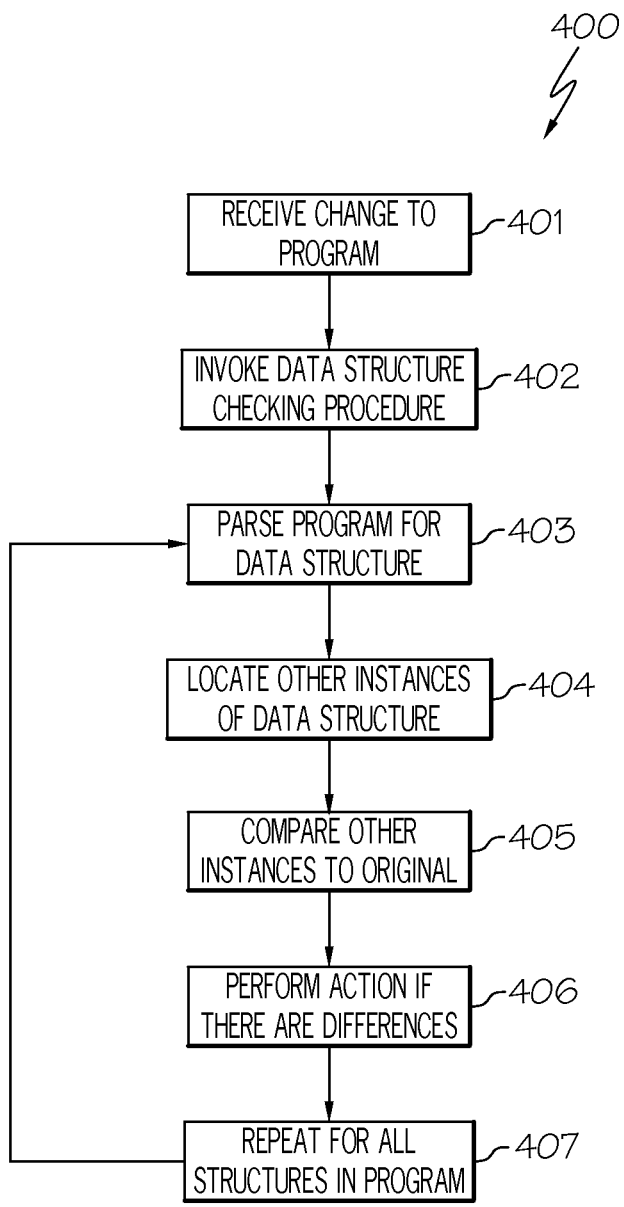
FIG. 4 is a flowchart of a method for performing software development in accordance with an embodiment of the present invention.

FIG. 4 is a flowchart summarizing the method 400 for developing the software product in accordance with an embodiment of the present invention. Referring to FIG. 4, in conjunction with FIGS. 1-3, in step 401, a change to a program 14 is received, whereby the programmer has used an IDE 10 or an editor to change an existing program 14. In step 402, a data structure checking procedure is invoked. Here a compiler plug-in, editor plug-in or IDE plug-in 16 would invoke the mechanism for checking any data structures 18 within the changed program 14. This is followed by step 403 which comprises parsing the amended program 14 for a reference to a data structure 18. The mechanism operated by the plug-in 16 would parse the program 14, looking for references to data structures 18.

In step 404, the mechanism will locate other instances of a referenced data structure 18 in other programs 14 within the software product 12. When such a data structure 18 is found, logic operated by the plug-in 16 will validate the format of the data structure 18 with respect to other instances of the same structure 18 within the other programs 14 comprising the software product 12 being developed or changed. Other instances of the structures could be predefined to the plug-in 16, or the plug-in 16 could search for them within the software product 12 under development/support.

In step 405, the referenced data structure 18 is compared to the located other instances of the data structure 18. If corresponding equivalent data structures 18 are found, their layout, length, field names, field lengths and field types, etc. would be compared.

After comparing the data structures 18, in step 406, a predefined action is performed in response to any detected differences between a referenced data structure 18 and the located other instances of the data structure 18. If differences are found, the mechanism would, for example, notify the user via editor messages, compiler messages or information output to a pane within the IDE 10. If similar structures with different names were found, the mechanism could notify the programmer of these too, in case they were valid instances of comparable structures.

In step 407, method 400 repeats steps 403-406 for all data structures 18 within the changed program 14. The plug-in 16 would iterate through the program until the end is reached. Control would return to the editor, compiler or IDE 10.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Figure 5:
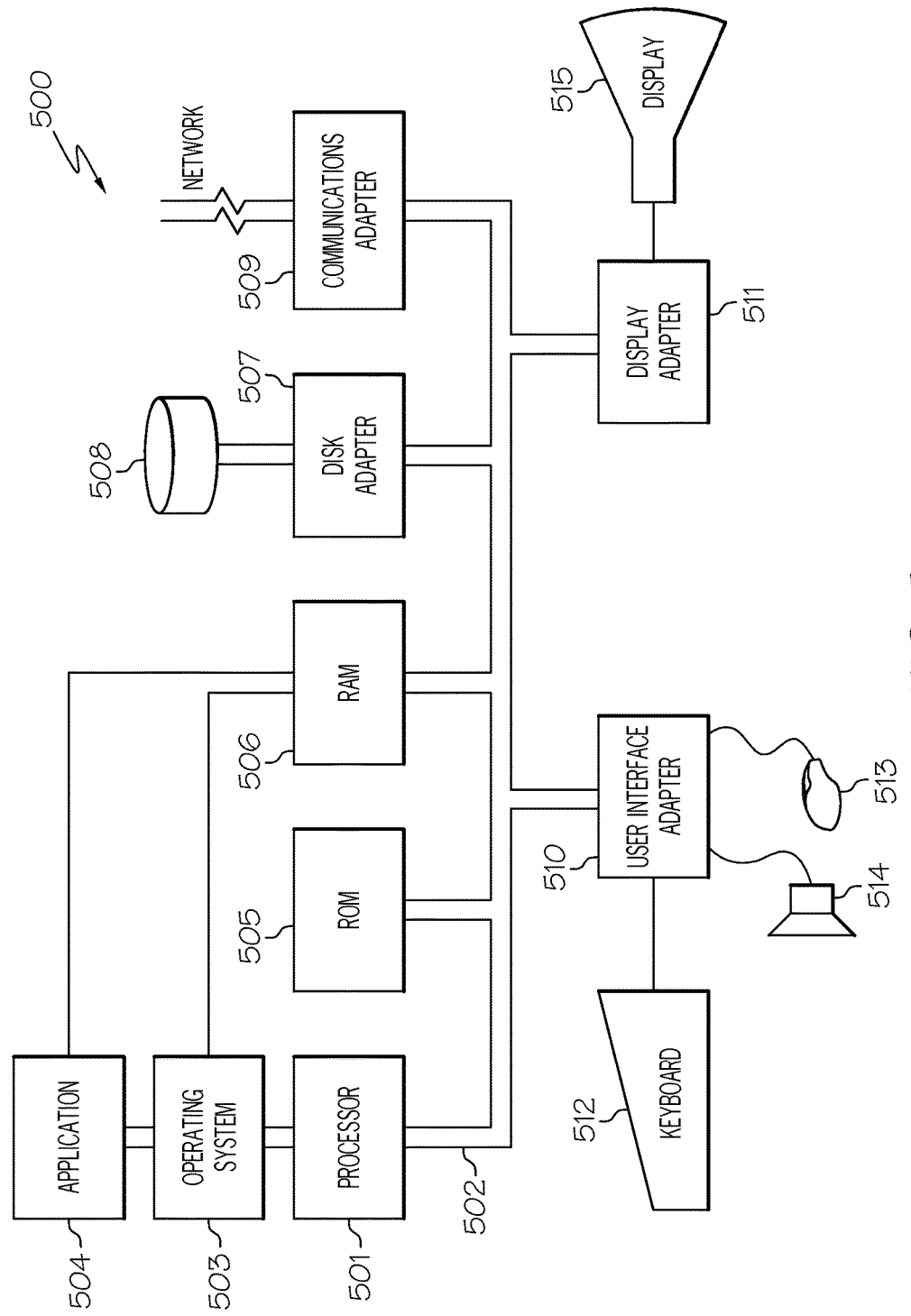
FIG. 5 depicts an embodiment of a hardware configuration of a computer system which is representative of a hardware environment for practicing the present invention.

FIG. 5 depicts an embodiment of a hardware configuration of a computer system 500 which is representative of a hardware environment for practicing the present invention. Referring to FIG. 5, computer system 500 has a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for developing software as discussed above.

Referring again to FIG. 5, read-only memory ("ROM") 505 may be coupled to system bus 502 and include a basic input/output system ("BIOS") that controls certain basic functions of computer device 500. Random access memory ("RAM") 506 and disk adapter 507 may also be coupled to system bus 502. It should be noted that software components including operating system 503 and application 504 may be loaded into RAM 506, which may be computer system's 500 main memory for execution. Disk adapter 507 may be an integrated drive electronics ("IDE") adapter that communicates with a disk unit 508, e.g., disk drive.

Computer system 500 may further include a communications adapter 509 coupled to bus 502. Communications adapter 509 may interconnect bus 502 with an outside network (not shown) thereby allowing computer system 500 to communicate with other similar devices.

I/O devices may also be connected to computer system 500 via a user interface adapter 510 and a display adapter 511. Keyboard 512, mouse 513 and speaker 514 may all be interconnected to bus 502 through user interface adapter 510. Data may be inputted to computer system 500 through any of these devices. A display monitor 515 (same as display device 20 of FIG. 3) may be connected to system bus 502 by display adapter 511. In this manner, a user is capable of inputting to computer system 500 through keyboard 512 or mouse 513 and receiving output from computer system 500 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for developing software, the software comprising a plurality of programs, the method comprising:
receiving a change to a program out of a plurality of programs within the software;
invoking a data structure checking procedure for checking any data structures within the changed program;
parsing the changed program for a reference to a data structure;
locating other instances of the data structure referenced by other programs within the software by locating data structures with a same name and structure features as the referenced data structure;
comparing layout, length, field names, field lengths and field types of the referenced data structure to the located other instances of the data structure to validate that their structures have remained consistent;
performing, by a processor, a predefined action in response to any detected differences between the referenced data structure and the located other instances of the data structure, wherein the performing of the predefined action comprises outputting a report informing a programmer of an existence of the other instances of the data structure, its location and details of detected differences between the referenced data structure and the other instances of the data structure, wherein the performing of the predefined action further comprises performing an auto-correction of those other instances of the data structure with a detected difference from the referenced data structure that are located elsewhere within the software to match the referenced data structure;
repeating said parsing, locating, comparing and performing for all data structures within the changed program;
detecting one or more other data structures considered to be similar to the referenced data structure based on a specific percentage of field numbers and lengths being identical; and
providing the programmer an opportunity to determine if the one or more other detected data structures considered to be similar to the referenced data structure are actually supposed to be the same as the referenced data structure thereby enabling the programmer to change those detected data structures considered to be similar manually if need be.

2. The method as recited in claim 1 further comprising:
generating a notification detailing the detected similar one or more data structures.

3. The method as recited in claim 1, wherein the comparison of the referenced data structure to the located other instances of the data structure is performed by a plug-in of an integrated development environment.

4. The method as recited in claim 1, wherein the changed program that references the data structure and a second program within the software that references an instance of the data structure are written by different programmers.

* * * * *